Patented May 21, 1929.

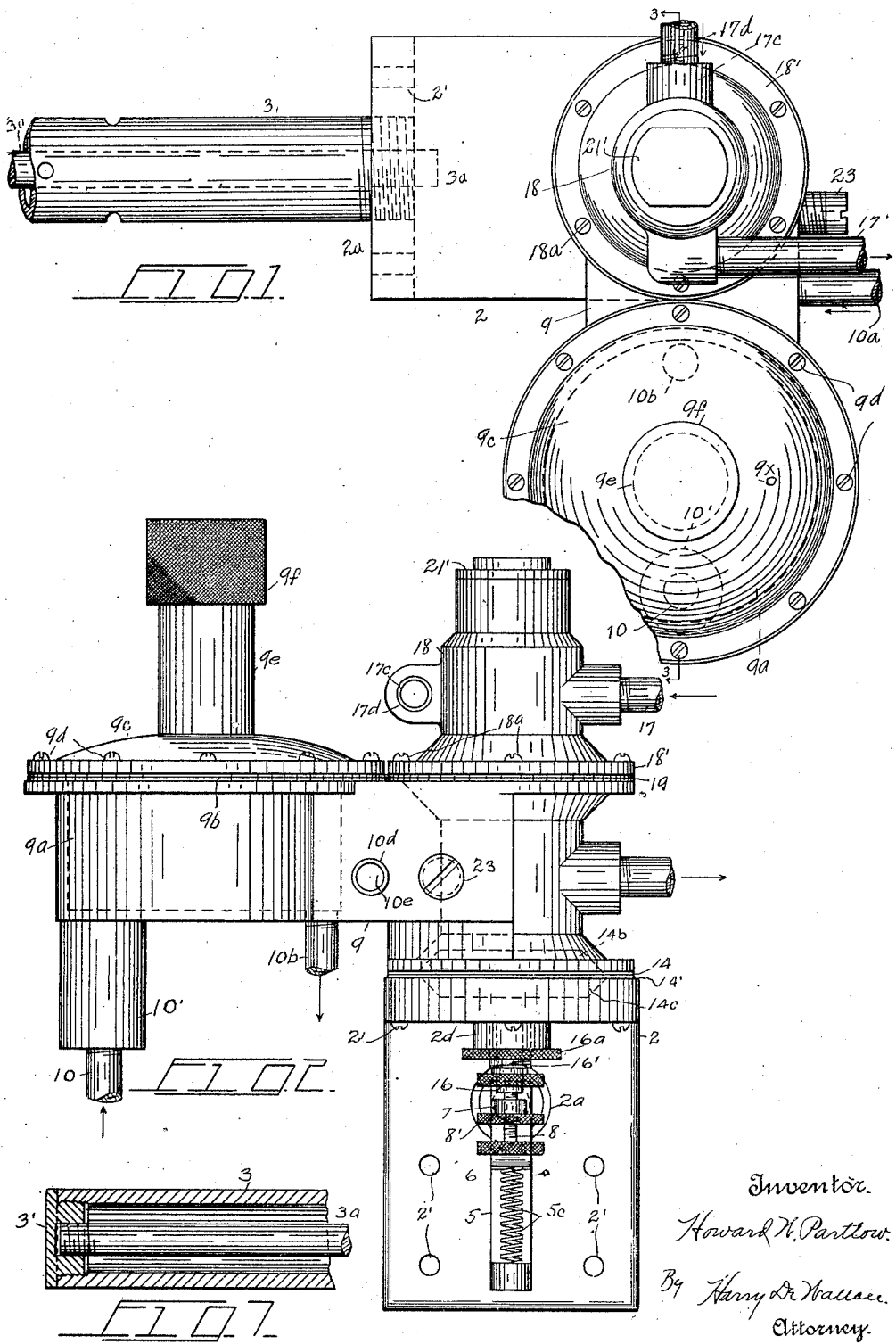

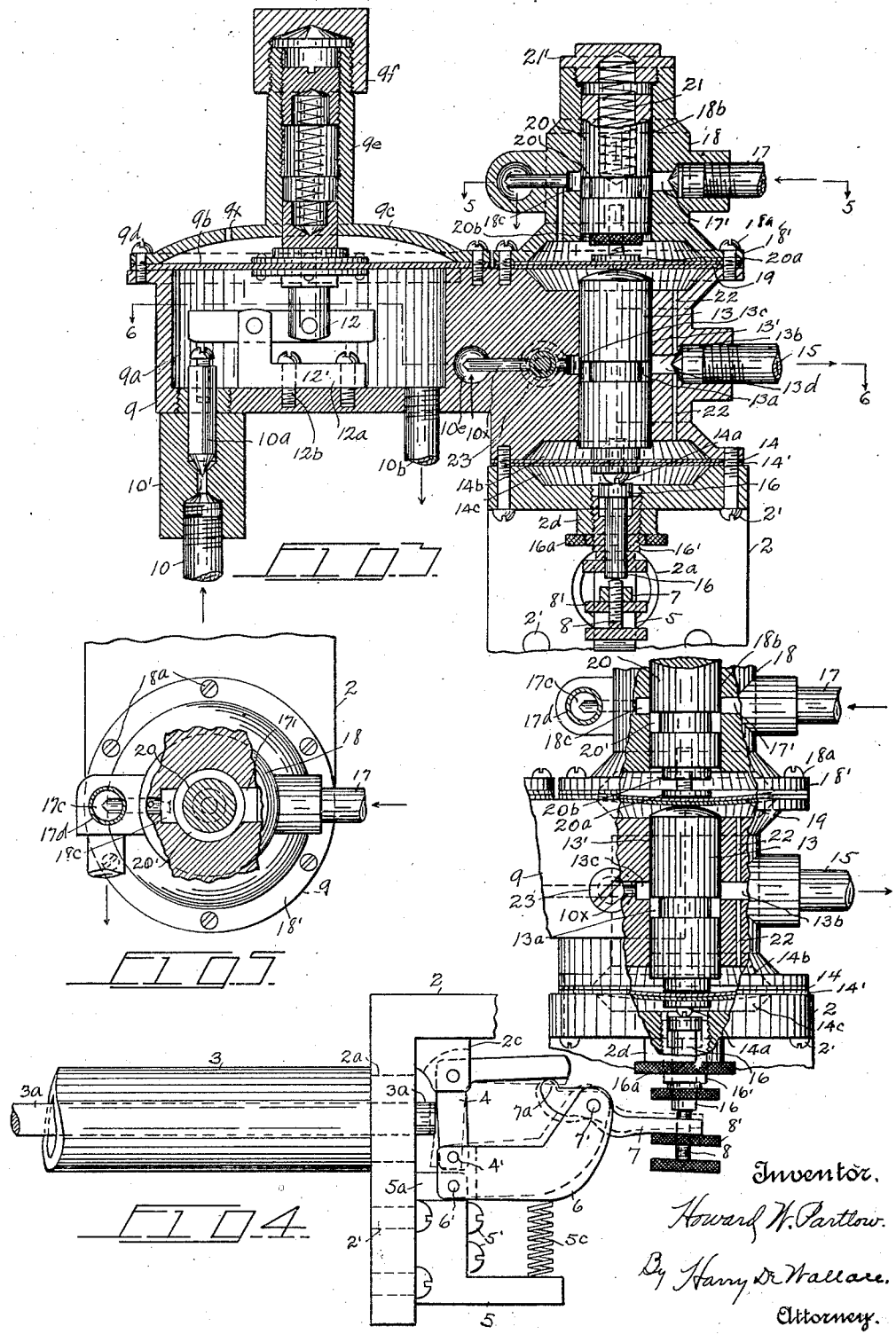

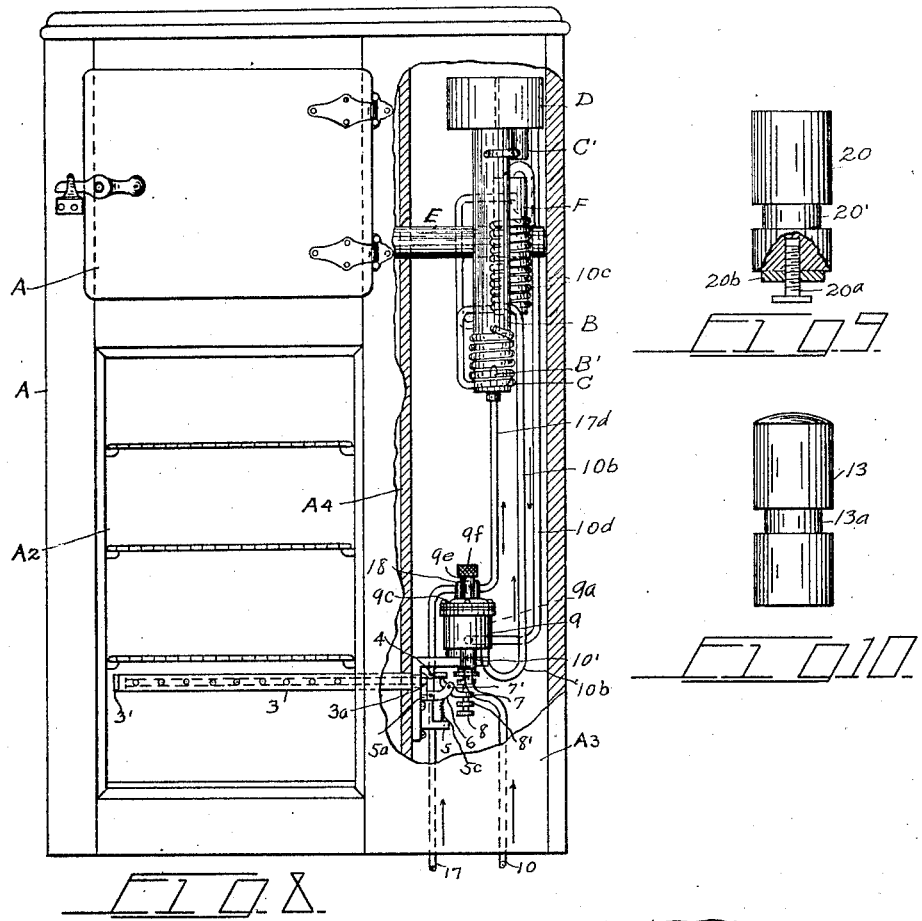
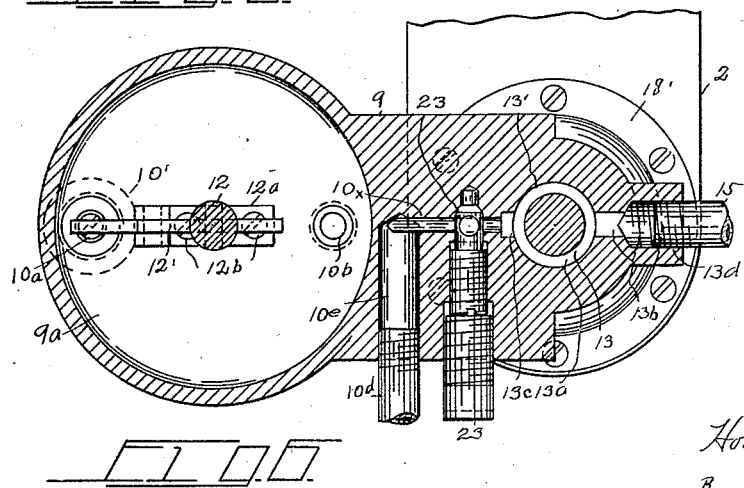

1,713,856

UNITED STATES PATENT OFFICE.

HOWARD W. PARTLOW, OF UTICA, NEW YORK.

TEMPERATURE REGULATOR.

Application filed September 15, 1927. Serial No. 219,776.

This invention relates to improvements in temperature control, designed particularly for use in connection with refrigerators, which operate upon the principle of "refrigeration by absorption", wherein the refrigerating agent, such as ammonia, is carried through a part of the cycle by an absorbent liquid, such as water, the ammonia for example being first absorbed by the water, then released from the water by heating, after which the ammonia gas is liquefied, by cooling it in a condenser. The ammonia gas is then made to evaporate at low pressure and temperature in an evapora-. tor, whereby heat is absorbed from the surroundings, which produces cold. This ordinarily completes one cycle of refrigeration.

The primary object of the present invention is to provide a combined temperature regulator, and means for supplying the heating, as well as, the cooling and the condensing agents, by which the absorbent liquid and the refrigerating agent are controlled. A further object is to provide an extremely sensitive thermostat, which is arranged to be disposed in the refrigerator cabinet, at a convenient point. The thermostat expands and contracts by the changes of the temperature of the cabinet and translates the said changes into mechanical motion, by means of a novel mechanism, which transmits the said motion to other parts of the control. A further object is to provide novel means for supplying the cooling agent, preferably water, which may be derived from the public supply; the said means including a sensitive mechanism adapted for regulating the flow of the water towards the condenser and other parts of the refrigerating system. A further object is to provide means for controlling the return flow of the water from the refrigerating system, and wasting or otherwise disposing of the discharge. A further object is to provide novel means for supplying the heating agent, referred to, which may consist of illuminating gas, by which the ammonia is evaporated from the absorbent liquid. And a further object is to provide independent means for adjusting the various mechanisms of the control.

The various features and parts of the invention will be understood from the detailed description which follows, and by reference to the accompanying drawings, in which—

Figure 1 is a top plan view of the complete control. Fig. 2 is a front end elevation of the same. Fig. 3 is a central vertical section, taken on line 3—3 of Fig. 1; showing the water and gas controlling members in position to supply the said elements to the refrigerating system. Fig. 4 is an irregular view, partially in elevation and partially in central vertical section, the section being taken on line 3—3 of Fig. 1 and the thermostat and related parts being swung around 90° relatively to the sectional view, for clearness. Fig. 5 is a horizontal section, taken on line 5—5 of Fig. 3. Fig. 6 is a similar section, taken on line 6—6 of Fig. 3. Fig. 7 is a broken longitudinal section of the closed end of the tubular thermostatic member. Fig. 8 is a broken front elevation of a refrigerator cabinet, to which the temperature control is applied. Fig. 9 is a view partially in elevation and partially in section of the gas valve, showing the adjusting parts. And Fig. 10 is an elevational view of the water exhaust valve.

In Fig. 8 is shown a cabinet A, having a refrigerating compartment A′, a storage compartment A², and a neutral compartment A³′ which is separated from the others, by a wall A⁴. The parts of the refrigerating system deemed essential to this description, are shown conventionally in the compartment A³, and comprise a generator consisting of a cylinder B, which is heated by a burner B′, the latter being mounted upon the top end of a pipe 17ᵈ. The generator B is surrounded by a coil C, which contains an absorbing fluid in which the ammonia is dissolved. The heating of this liquid evaporates the ammonia, which rises and passes through a rectifier C′ and then enters a condenser D in which the ammonia is liquefied. The liquid flows thence to an evaporator (not shown), which is located in the refrigerating compartment A′, through a gas heat exchanger E. The water remaining after the evaporation of the ammonia usually flows from the generator to an absorber F where it again becomes impregnated with the ammonia from the evaporator, in a well known manner. The cooling water supplied by my temperature control is first carried through a pipe 10$^b$ to and cools the absorber F, and thence passes on to the condenser D, from which the water returns via a pipe 10$^d$ to the control.

In the drawings, 2 represents an L-shaped bracket, which supports the whole controlling mechanism. The vertical arm of the bracket is perforated at 2', for attachment to another part. This arm has a larger threaded perforation 2$^a$, into which one end of the tubular thermostatic member 3 is screwed. The opposite or free end of the tube 3 is closed by a plug 3' (see Fig. 7), to which is rigidly secured one end of the solid thermostatic member 3$^a$. The horizontal arm of the bracket 2 is formed with a split lug 2$^c$, that pivotally supports a bell-crank 4, which is rocked in a vertical plane by the rod 3$^a$, when the latter is moved axially by the expansion and contraction of the tube 3. 5 represents a smaller bracket which is secured to the bracket 2, by screws 5', and is provided with a perforated lug 5$^a$, to which the forked rear end of a lever 6 is pivoted, by a pin 6'. The depending arm of the bell-crank is also pivoted to the lever 6, by a pin 4'. The lever 6 is resiliently supported by a coil spring 5$^c$, which rests upon the horizontal arm of the bracket 5. 7 represents a rocking lever, which is pivoted intermediate its ends to the free end of the lever 6, by a pin 7', the short end of the lever 7 is formed with a ball 7$^a$, which is normally in engagement with the horizontal arm of the bell-crank 4. The longer end of the lever 7 has a threaded perforation for receiving a screw 8, by which certain adjustments may be made for enabling the thermostat to vary the supply of the water and gas to the refrigerating system. 8' represents a lock-nut, by which the said adjustments may be maintained.

The water for cooling the several parts of the refrigerating system passes through a body 9, which is detachably mounted upon the horizontal arm of the bracket 2, by screws 2$^b$, at one end the body 9 is formed with a relatively large open-top chamber 9$^a$, that receives the water from any suitable supply, by a pipe 10, and a depending part 10', in which is disposed a needle valve 10$^a$, that controls the inflow of the water. The top of chamber 9$^a$ is closed by a diaphragm 9$^b$, which is clamped in place by a cover 9$^c$ and screw 9$^d$. The cover is formed with an upright hollow neck 9$^e$, whose free end is closed by a screw-cap 9$^f$. The diaphragm 9$^b$ is fitted with a depending slotted post 12, which pivotally supports a lever 12', the said lever being also pivoted to the upright arm of an L-shaped bracket 12$^a$, which is secured to the bottom of the chamber 9$^a$, by screws 12$^b$. The lever 12' is arranged to engage the top end of the needle valve, whenever the diaphragm flexes upwardly by the force of the water pressure, for depressing the said valve and reducing or shutting off the supply of the water. Upon the top face of the diaphragm 9$^b$ is mounted a piston-like guide 12$^c$, which reciprocates in the bore of the neck 9$^e$, by the flexing of the diaphragm 9$^b$. The diaphragm is normally under tension produced by a compression spring 12$^d$, the said tension being controlled by a threaded plug 12$^e$, which engages internal threads of the neck 9$^e$. In practice, the tension of spring 12$^d$ is predetermined for controlling the supply of the cooling water delivered to the refrigerating system and when the pressure of the water entering the chamber 9$^a$ exceeds the said tension, it flexes the diaphragm upwardly, which rocks the lever 12' in the direction for closing the needle valve. The cover 9$^c$ is provided with a small vent 9$^x$ for facilitating the flexing of the diaphragm. The water is drawn from the chamber 9$^a$, through a bottom opening in which a pipe 10$^b$ is screwed. The water is carried by the pipe 10$^b$ to a coil 10$^c$, which surrounds the absorber F, and then passes on to the condenser D, from which the water returns by a pipe 10$^d$ to a small chamber 10$^e$ in the body 9. The exhaust or waste of the water is finally effected by a cylindrical floating valve 13, which is reciprocatable in a chamber 13'. The valve 13 is supported by a two-ply diaphragm 14—14' to which the said valve is secured by a screw 14$^a$, the said diaphragms being disposed between the body 9 and the bracket 2, and the corresponding portions of said parts being formed with the usual diaphragm cavities, as 14$^b$—14$^c$. The valve 13 is formed intermediate its ends with a circumferential groove 13$^a$, which is arranged to register with corresponding slotted ports 13$^b$—13$^c$, that align with passages 10$^x$ and 13$^d$, for finally discharging the water through a pipe 15, which may connect with a sewer, or other source of waste. The valve 13 is raised and lowered by the reciprocation of a plunger 16, whose top end is arranged to normally engage the screw 14$^a$, the bottom end of said plunger being normally in contact with the screw 8 carried by the lever 7. The plunger 16 is supported in a bushing 16', which screws into a depending boss 2$^d$ of the bracket 2, and to which is applied a lock-nut 16$^a$, for maintaining the adjustment of the said bushing.

The gas for heating the generator B is delivered by pipe 17 to a reduced body portion 18, which is formed with a bottom flange 18' that rests upon the body 9 and is detachably secured thereto by screws 18$^a$. A two-ply diaphragm 19 is also interposed between the bodies 9 and 18, the uppermost diaphragm preferably being leather or like substance suitable for withstanding the action of the gas, while the lowermost diaphragm may be rubber, such as commonly employed in connection with water fixtures. The gas supplied by pipe 17 passes through a restricted slotted port 17' and enters a chamber or bore 18$^b$, in which is reciprocatably disposed a similar cylindrical valve 20, that is normally supported by the diaphragm 19, in line axially with the valve 13. The valve 20 is formed with a circumferential groove 20′, which is arranged to register with the port 17′, and a similar slotted port 18$^c$ at the opposite side of the bore 18$^b$, which discharges the gas into a small chamber 17$^c$, from which the gas flows to the generator B, by pipe 17$^d$, to which the burner B′ is attached. The lower end of the valve 20 is fitted with an adjusting screw 20$^a$ for varying the supply of gas relatively to the water supply, whose head directly engages the diaphragms 19, and the said screw is provided with a locknut 20$^b$ for maintaining the adjustments. The valve 20 is preferably held resiliently in contact with the diaphragms 19, by a coil compression spring 21, which is held in place and whose tension is regulated by a screw plug 21′ that is threaded into the top end of the body 18. The valve 20 and the plug 21′ are correspondingly chambered to receive the said spring. The top face of the body 9 and the bottom face of the body 18 are correspondingly recessed, as shown in Figs. 3 and 4, for providing the usual chambers for the diaphragms 19. Similar ducts 22 are formed in the body 9 for draining the upper and lower diaphragm cavities, in case water seeps past valve 13. A similar duct 18$^d$ allows gas escaping past the valve 20 to flow into the chamber 17$^c$.

The operation of the valves 13—20 may be understood by comparing Figs. 3 and 4. In Fig. 3 both of said valves are shown partially open for supplying measured volumes of the heating and cooling fluids, the said volumes being predetermined and being controlled partially by the adjusting screws 8′ and 20$^a$, and for a particular instillation this may be considered the maximum opening range for the said valves. It will be understood however, that the valves 13—20 may be opened to less extent, by the varying changes of the temperature in the cabinet A, through the expansion of the thermostatic member 3, and the corresponding movements of the rod 3$^a$. Valves 13—20 are supported mainly by the diaphragms 14 and 19, and tend to gravitate without assistance when the plunger 16 descends by the contraction of the member 3. The spring 21 is employed principally for effecting the positive gravitation of the valves, in case they tend to stick.

In Fig. 4, the valves 13—20 are almost entirely closed. The grooves 13$^a$ and 20′ being positioned below the ports 13$^b$—17′. This means that the temperature of the cabinet A has been lowered to the predetermined degree, by the action of the refrigerating system. In Fig. 4, the mechanism operated directly by the rod 3$^a$ has been swung around 90°, relatively to the upper portion of the said view, so as to show how the said mechanism controls the operation of valves 13—20. Fig. 4 shows the rod 3$^a$ projecting through the bracket 2 sufficiently to rock the bell-crank 4, as well as lever 6, against the tension of spring 5$^c$, as to the full line position (see Fig. 4), which spreads the free ends of said parts and allows the longer end of the lever 7 to gravitate. This relieves the pressure of the screw 8′ against the plunger 16, and effects the gravitation of the valves 13—20. The weight of the said valves being then thrown entirely upon the diaphragms 14—19 flexes the diaphragm downwardly and substantially shuts off the inflow of the gas and the waste of the water, as shown in Fig. 4. The valves 13—20 are preferably so adjusted as to prevent them from entirely closing. By this arrangement a tiny pilot-flame may be maintained at the burner B′, and the water discharging through a pipe 13$^e$ will also show a slight drop by drop waste, indicating that the control is in proper working order. In order to avoid unnecessary waste of the water supplied for cooling the refrigerating parts, I provide a valve 23, which is disposed in the exhaust passage 10$^x$, for controlling the flow of the water through the regulator and the refrigerating system. Valve 23 virtually controls the inlet of the water at the needle valve 10$^a$. When the tube 3 expands, by the rise of temperature in cabinet A, it moves the rod 3$^a$ away from bell-crank 4. This enables the spring 5$^c$ to lift the free end of lever 6, which lowers the horizontal arm of the bell-crank 4, with the result that lever 7 is rocked in the direction for again opening the valves, as shown in Fig. 3.

From the foregoing it will be understood that my temperature control is extremely sensitive and capable of the finest as well as the positive and economical regulation of the gas and water supplying means, and when once properly adjusted with respect to predetermined temperatures for any instillation, it is not liable to get out of order nor require any attention or care.

Having thus described my invention, what I claim, is—

1. In a temperature control for refrigerating systems and the like, a thermostat, means to mount the thermostat, a body supported by said means formed with a water chamber, a valve and a diaphragm for controlling the inlet of the water, a valve for controlling the flow of the water through said system and for effecting the waste of the water, tension means rendered operable by the expansion of said thermostat for opening the waste valve, the said means adapted to close the waste valve when the thermostat contracts.

2. In a temperature control for refrigerating systems and the like, a thermostat adapted to be mounted within the refrigerating zone, a water chamber, means for conducting measured volumes of the water towards and from the refrigerating system, a valve for controlling the waste of the water returned from the said system, a valve for supplying gas for heating parts of said system, said waste valve adapted to control the opening and closing of the gas valve, and means controlled by the expansion and contraction of the thermostat for effecting the reciprocation of the said waste valve.

3. In a temperature control for refrigerating systems and the like, the combination with a thermostat including an expansible member and a non-expansible member, of similar valves operable in unison for severally controlling the supply of gas and water for heating and cooling parts of the said system, means actuated by the non-expansible member for closing said valves when a predetermined temperature has been effected, means for opening said valves when the temperature exceeds the predetermined degree, and means for shutting off the water supply temporarily when the pressure of the water exceeds a predetermined stage.

4. In a temperature control for refrigerators and the like, a thermostat adapted to be inserted in a refrigerator cabinet, a valve for controlling the flow of cooling fluid towards the refrigerating system, a valve for controlling the flow of gas for heating parts of said system, said valves aligning axially and adapted to be reciprocated as one part, tension means for opening said valves when the thermostat expands, and said tension means adapted to be rendered inoperable by the contraction of the thermostat for effecting the gravitation and closing of said valves.

5. In a temperature control for refrigerating systems and the like, a thermostat, means to mount the thermostat within the refrigerating zone, a body supported by said means formed with a water chamber, a valve and a diaphragm for controlling the inlet of the water to said chamber, a valve for controlling the flow of the water from said chamber to said system and for effecting the waste of the water, a valve for supplying gas to said system, tension controlled mechanism rendered operable by the expansion of said thermostat for opening the gas and the waste valves, the said tension being neutralized for enabling said mechanism to close the waste and gas valves by the contraction of the thermostat.

6. In a temperature control for refrigerating systems and the like, a thermostat adapted to be disposed within the refrigerating zone, a chamber adapted to supply water for cooling parts of the said system, a valve for controlling the flow of the water from said chamber to said system and for effecting the waste of the water during the cooling periods, means actuated by the contraction of the thermostat for closing said valve, means operable by the expansion of the thermostat for opening said valve, and a valve for supplying gas for heating parts of the said system, said gas valve being controlled by the opening and closing movements of the water valve.

7. A temperature regulator for refrigerating systems or the like, comprising a pair of valves adapted to be operated in unison for controlling the supply of gas and water for heating and cooling parts of the system, a thermostat, and means interposed between the thermostat and the valves to actuate the latter to open the same when the system reaches a predetermined high degree of temperature, said valves being gravity actuated to close when the system reaches a predetermined low degree of temperature.

8. A temperature control for refrigerators or the like, comprising a bracket having an opening, a thermostat secured to said bracket and having a non-expansible element movable through said opening, a valve chamber supported by said bracket, a pair of valves in said chamber operable in unison for controlling the supply of gas and water for heating and cooling parts of the system, means interposed between the valves and the non-expansible element to open the valves upon movement of said element in one direction when the system reaches a predetermined high degree of temperature, said valves being gravity actuated to close upon movement of said element in an opposite direction when the system reaches a predetermined low degree of temperature.

9. A temperature control for refrigerating systems or the like, comprising a bracket, a thermostat carried by said bracket and having a non-expansible element, a pair of vertically aligned valves supported by said bracket for controlling the supply of gas and water to said system, a resiliently supported rockable member interposed between the valves and non-expansible element to open the valves upon movement of said element in one direction, and releasable means carried by said rockable member and actuated upon movement of said element in a reverse direction, to permit the valves to close.

10. A temperature control for refrigerating systems or the like, comprising a thermostat, a pair of valves associated with said thermostat and operable in unison to control the supply of gas and water to said system, a spring actuated member interposed between the thermostat and valves to open the latter upon movement of the thermostat in one direction, and releasable means carried by the spring actuated member formed to permit the valves to close by gravity upon movement of the thermostat in an opposite direction.

11. A temperature control for refrigerating systems or the like, comprising a thermostat, a pair of valves operable in unison to control the supply of gas and water to said system, a pressure actuated member interposed between the thermostat and valves to open the latter upon movement of the thermostat in one direction, and means carried by the pressure actuated member for releasing the valves to permit the same to close by gravity upon movement of the thermostat in an opposite direction.

In testimony whereof I affix my signature.

HOWARD W. PARTLOW.